(12) United States Patent  
Seo

(10) Patent No.: US 11,279,046 B2  
(45) Date of Patent: Mar. 22, 2022

(54) WORKPIECE HOLDING DEVICE

(71) Applicant: SMC CORPORATION, Chiyoda-ku (JP)

(72) Inventor: Takeshi Seo, Nagareyama (JP)

(73) Assignee: SMC CORPORATION, Chiyoda-ku (JP)

( * ) Notice: Subject to any disclaimer, the term of this patent is extended or adjusted under 35 U.S.C. 154(b) by 166 days.

(21) Appl. No.: 16/614,047

(22) PCT Filed: Apr. 11, 2018

(86) PCT No.: PCT/JP2018/015184  
§ 371 (c)(1),  
(2) Date: Nov. 15, 2019

(87) PCT Pub. No.: WO2018/211869  
PCT Pub. Date: Nov. 22, 2018

(65) Prior Publication Data  
US 2021/0154862 A1 May 27, 2021

(30) Foreign Application Priority Data

May 18, 2017 (JP) .............................. JP2017-099091

(51) Int. Cl.  
*B25J 15/06* (2006.01)  
*B25J 15/00* (2006.01)

(52) U.S. Cl.  
CPC ....... *B25J 15/0028* (2013.01); *B25J 15/0608* (2013.01)

(58) Field of Classification Search  
None  
See application file for complete search history.

(56) References Cited

U.S. PATENT DOCUMENTS

| 4,623,183 | A | * | 11/1986 | Aomori | .................. | B25J 15/103 |
| | | | | | | 294/106 |
| 4,765,669 | A | | 8/1988 | Meier | | |
| 5,437,490 | A | | 8/1995 | Mimura et al. | | |
| 9,868,218 | B2 | * | 1/2018 | Li | ......................... | B25J 15/022 |
| 2010/0078953 | A1 | * | 4/2010 | Ban | ..................... | B25J 15/0266 |
| | | | | | | 294/106 |

(Continued)

FOREIGN PATENT DOCUMENTS

CN            201089162 Y    7/2008  
DE    10 2014 223 118 A1    5/2016

(Continued)

OTHER PUBLICATIONS

Office Action dated May 12, 2020 in corresponding Japanese Patent Application No. 2017-099091 (with English Translation), 10 pages.

(Continued)

*Primary Examiner* — Gerald McClain  
(74) *Attorney, Agent, or Firm* — Oblon, McClelland, Maier & Neustadt, L.L.P.

(57) ABSTRACT

A workpiece holding device includes a plurality of holding claws configured to hold a workpiece, and holding cylinders as claw opening/closing members configured to displace the holding claws in a direction closer to or away from a first workpiece. The holding cylinders are provided for the holding claws, respectively. Therefore, the plurality of holding claws can be opened/closed individually. The holding cylinders are held on a support disk as a holding member in a movable manner. That is, by moving the holding cylinders to arbitrary positions on the support disk, the holding cylinders are positioned fixedly.

5 Claims, 11 Drawing Sheets

(56) References Cited

U.S. PATENT DOCUMENTS

| | | | |
|---|---|---|---|
| 2011/0135436 A1 | | 6/2011 | Yeum et al. |
| 2016/0075036 A1* | | 3/2016 | Lessing ................ B25J 15/0023 361/234 |
| 2016/0361821 A1 | | 12/2016 | Lessing et al. |

FOREIGN PATENT DOCUMENTS

| | | |
|---|---|---|
| JP | 5-69374 A | 3/1993 |
| JP | 6-298355 A | 10/1994 |
| JP | 8-300287 A | 11/1996 |
| JP | 2007-32216 A | 2/2007 |
| JP | 2010-82748 A | 4/2010 |
| JP | 2013-857 A | 1/2013 |
| JP | 2013-151210 A | 8/2013 |
| JP | 2014-97555 A | 5/2014 |
| TW | M451227 U1 | 4/2013 |

OTHER PUBLICATIONS

International Search Report and Written Opinion dated Jul. 26, 2018 in PCT/JP2018/015184 filed Apr. 11, 2018.

Combined Taiwanese Office Action and Search Report issued Nov. 9, 2018 in Patent Application No. 107113211 (with partial English language translation), 11 Pages.

Notice of Reasons for Refusal dated Oct. 1, 2019 in Japanese Patent Application No. 2017-099091 (with English language machine translation), 12 Pages.

Korean Office Action dated Apr. 29, 2021 in Korean Patent Application No. 10-2019-7034867 (with English translation), 8 pages.

\* cited by examiner

WORKPIECE HOLDING DEVICE

TECHNICAL FIELD

The present invention relates to a workpiece holding device for holding a workpiece by a plurality of holding claws.

BACKGROUND ART

Conventionally, in order to improve production efficiency, at least a part of each process in a production line has been automated and a robot carries out certain work. In this case, for example, as described in Japanese Laid-Open Patent Publication No. 2013-000857, a workpiece gripping device (what is called a robot hand) is attached to a robot for taking a workpiece out of a predetermined place, and transporting the workpiece to another place.

SUMMARY OF INVENTION

Conventional workpiece gripping devices are capable of gripping workpieces having simple shapes such as a member in the form of a flat plate. However, it has not been possible for such workpiece gripping devices to grip workpieces with various shapes. For example, the workpiece gripping device according to Japanese Laid-Open Patent Publication No. 2013-000857 can grip workpieces with various sizes, but cannot grip workpieces with various shapes.

A main object of the present invention is to provide a workpiece holding device that can hold workpieces with various shapes or in various orientations.

According to one embodiment of the present invention, the present invention provides a workpiece holding device including a plurality of holding claws configured to hold a workpiece. The workpiece holding device includes a plurality of claw opening/closing members provided for the holding claws, respectively, and configured to displace the holding claws in a direction closer to or away from the workpiece, a holding member configured to hold each of the claw opening/closing members in a movable manner individually, and a displacing member configured to displace the holding members together with the holding claws.

For example, after a workpiece having a certain shape is transported by operation of a displacing member, when another workpiece having a different shape is to be held, the claw opening/closing members can be moved to a position where it is possible to hold the workpiece. In this manner, in the present invention, by changing the position of the claw opening/closing member depending on the shape of the workpiece, it becomes possible to hold different shapes of workpieces.

Further, a plurality of holding claws are opened/closed individually. Therefore, for example, after operating one holding claw to change the orientation of the workpiece so that the workpiece can be held easily, by operating the remaining holding claws, it is possible to hold the workpiece. Also by changing the orientation of the workpiece in this manner, it is possible to hold different shapes of workpieces. It is a matter of course that these techniques of moving the claw opening/closing member, and opening/closing the holding claws individually may be adopted in combination.

Preferably, a magnet gripper configured to magnetically attract the workpiece may be provided for the holding claw. It is because, by this magnetic attraction, it is possible to prevent detachment of the workpiece from the holding claws.

Further, preferably, a contact part configured to be displaced in a direction closer to or away from the workpiece may be provided, and the contact part may be configured to contact the workpiece when the contact part is displaced to a position close to the workpiece. By bringing the contact part into contact with a portion of the workpiece, orientation of the workpiece is stabilized. Stated otherwise, sway of the workpiece is suppressed. Therefore, it becomes easy to deliver the transported workpiece to a predetermined position in a predetermined orientation.

Also in this contact part, the magnet gripper configured to magnetically attract the workpiece may be provided. In this case, for example, after the workpiece is temporarily magnetically attracted (held), and the workpiece can be transferred to the magnet gripper of the holding claws. Therefore, it is possible to change the orientation of the workpiece.

Further, for example, when the plurality of workpieces are magnetically attracted by the magnet gripper at the contact part, only one workpiece can be transferred to the magnet gripper of the holding claw. That is, it is possible to select only one workpiece to be transported.

For enabling movement of the claws opening/closing members, for example, a slit may be formed in the holding member. Further, by allowing the claw opening/closing member to move along the slit and to be fixedly positioned at the destination, it becomes possible to open/close the holding claw under operation of the claw opening/closing member at the destination.

In the structure, it is preferable to provide a guide member configured to guide the claw opening/closing member when the claw opening/closing member is displaced. Thus, it is possible to move the claw opening/closing members along the slits.

Though the number of holding claws is not limited specially, preferably, the number of the holding claws may be three or four. It is because, in this case, it is possible to hold the workpiece sufficiently stably, and avoid the use of excessive number of holding claws, and consequently, it is possible to avoid increase in the cost.

In the present invention, it is possible to move the claw opening/closing members, and open/close the holding claws individually. That is, it is possible to move the claw opening/closing members and the holding claws, and open/close the holding claws individually. Accordingly, it is possible to hold, and transport different shapes of workpieces in different orientations.

The above and other objects, features, and advantages of the present invention will become more apparent from the following description when taken in conjunction with the accompanying drawings in which preferred embodiments of the present invention is shown by way of illustrative example.

DESCRIPTION OF EMBODIMENTS

Hereinafter, preferred embodiments of a workpiece holding device according to the present invention will be described in detail with reference to the attached drawings.

Figure 1:
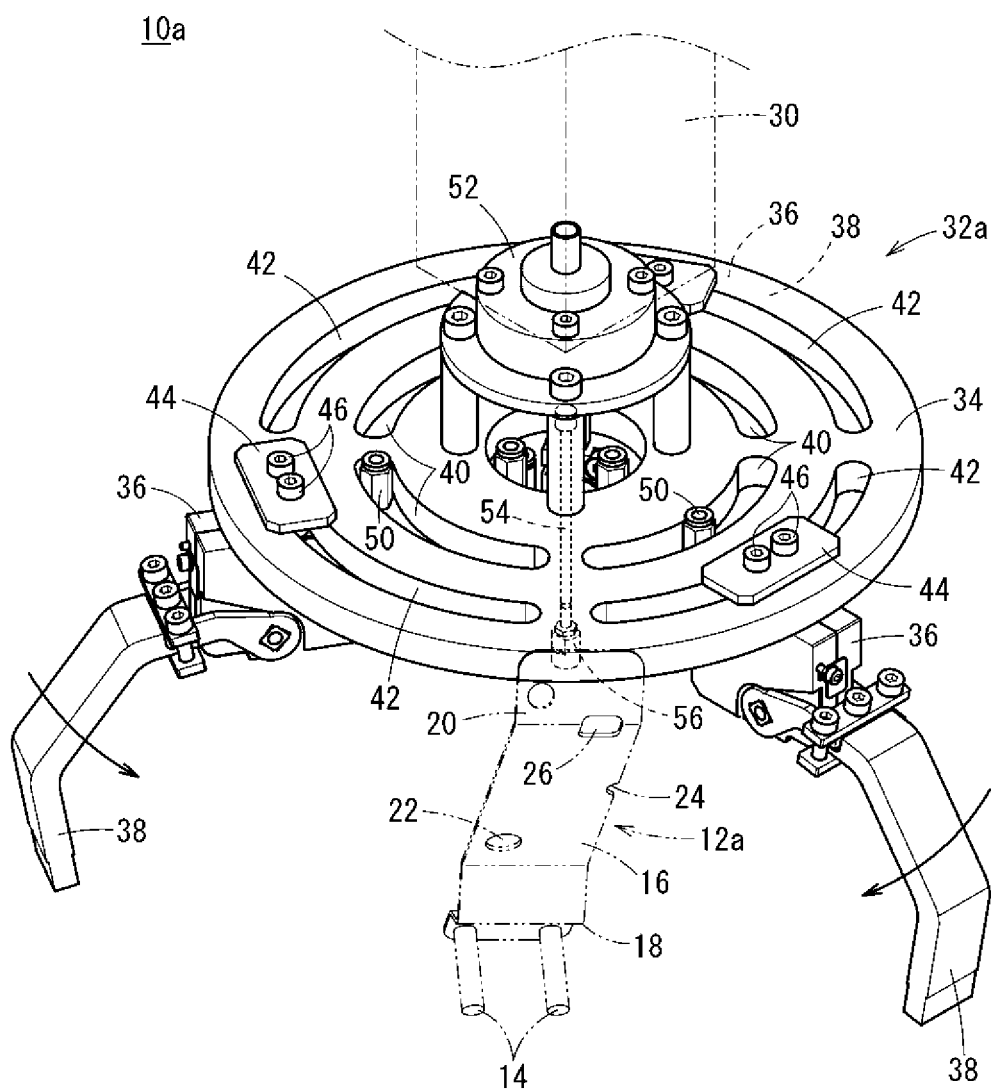
FIG. 1 is a perspective view schematically showing main components of a workpiece holding device according to a first embodiment of the present invention.

FIG. 1 is a view schematically showing main components of a workpiece holding device 10a according to a first embodiment. The workpiece holding device 10a is capable of holding, and workpieces in various shapes including, typically a first workpiece 12a.

Firstly, the first workpiece 12a will be described briefly. Two columnar projections 14 are provided at one end of the first workpiece 12a. The first workpiece 12a includes a long flat part 16. A mountain fold portion 18 is formed at one end, and a bent portion 20 is formed at the other end of the flat part 16. Further, a through hole 22 and a semicircular cut 24 are formed in the flat part 16, and another through hole 26 is formed in the bent portion 20. For example, the first workpiece 12a is accommodated in a stocker (not shown), with the mountain fold portion 18 oriented downward, and the bent portion 20 oriented upward.

The workpiece holding device 10a includes a robot (not shown) as a displacing member (transportation member) and a holding part 32a provided at an end arm 30 of the robot, and configured to hold the first workpiece 12a.

The holding part 32a includes a support disk 34 having a substantially circular disk shape as a holding member provided at the end arm 30, holding cylinders 36 as claw opening/closing members, and a plurality of (three, in the first embodiment) holding claws 38. In the support disk 34, four inner circular arc slits 40 and four outer circular arc slits 42 are formed. The inner circular arc slits 40 are positioned along a circle. The outer circular arc slits 42 are positioned along another circle. These two circles are concentric circles having a common center.

The holding cylinders 36 are provided individually for the holding claws 38, respectively, so as to open/close (rotate) the holding claws 38, individually. That is, the number of the holding cylinders 36 and the number of the holding claws 38 are the same. Therefore, for example, it is possible to open/close the three holding claws 38, e.g., sequentially.

Two cylindrical bolt receivers (not shown) and two fittings 50 for connection to a supply/discharge tube for supplying/discharging a compressed air are provided at end surfaces of the holding cylinders 36. The cylindrical bolt receivers are positioned below the outer circular arc slits 42, and one fitting 50 is positioned corresponding to each of the inner circular arc slits 40.

Bolts 46 are screwed into bolt holes of the cylindrical bolt receivers. The bolts 46 are inserted into through holes formed in locking plates 44. That is, the bolts 46 are inserted into through holes and outer circular arc slits 42, and enters the bolt holes. The locking plates 44 are blocked by the support disk 34. In the structure, the bolts 46 are locked, and the holding cylinders 36 are fixedly positioned to the support disk 34. In FIG. 1, the three holding cylinders 36 and the holding claws 38 are held on the support disk 34 in a manner that the three holding cylinders 36 and the three holding claws 38 are spaced from one another at substantially 120°. Since the outer circular arc slits 42 are positioned on one same circle, the holding claws 38 are positioned on one same circle as well.

Further, the fittings 50 enter the inner circular arc slits 40. The fittings 50 are partially exposed from the inner circular arc slits 40. As described later, at the time of displacing the holding cylinders 36, the fittings 50 are displaced along the inner circular arc slits 40 to guide the holding cylinders 36. That is, the fittings 50 function as a guide member.

Ends of the holding claws 38 on one side are attached to the holding cylinders 36, and the other ends of the holding claws 38 are bent toward the center of the concentric circles. When the other ends of the holding claws 38 are positioned close to each other to the extent possible, the holding claws 38 are closed to grip the first workpiece 12a, i.e., the holding claws 38 are placed in the clamped state. The other ends of the holding claws 38 can be rotated in a manner to be spaced away from each other in directions indicated by arrows. At this time, the holding claws 38 are placed in the unclamped state to release the first workpiece 12a.

A pushing cylinder 52 is provided at the center of the concentric circles. A pusher 56 as a contact part is provided at a tip end of a rod 54 of the pushing cylinder 52. When the rod 54 moves forward (downward), the pusher 56 contacts (pushes) the bent portion 20 of the first workpiece 12a. When the rod 54 moves backward (upward), the pusher 56 is spaced away from the first workpiece 12a.

The workpiece holding device 10a according to the first embodiment basically has the above structure. Next, operation and effects of the workpiece holding device 10a will be described.

For example, the first workpiece 12a is accommodated in a predetermined workpiece stocker. The robot moves the end arm 30 as necessary for making positional alignment in a manner that the end arm 30 moves to a position adjacent to the first workpiece 12a, and the bent portion 20 of the first workpiece 12a is positioned at the center of the concentric circles, i.e., substantially and immediately below the pusher 56. At this time, the holding claws 38 are in the unclamped state where the holding claws 38 are spaced from one another.

Figure 2:
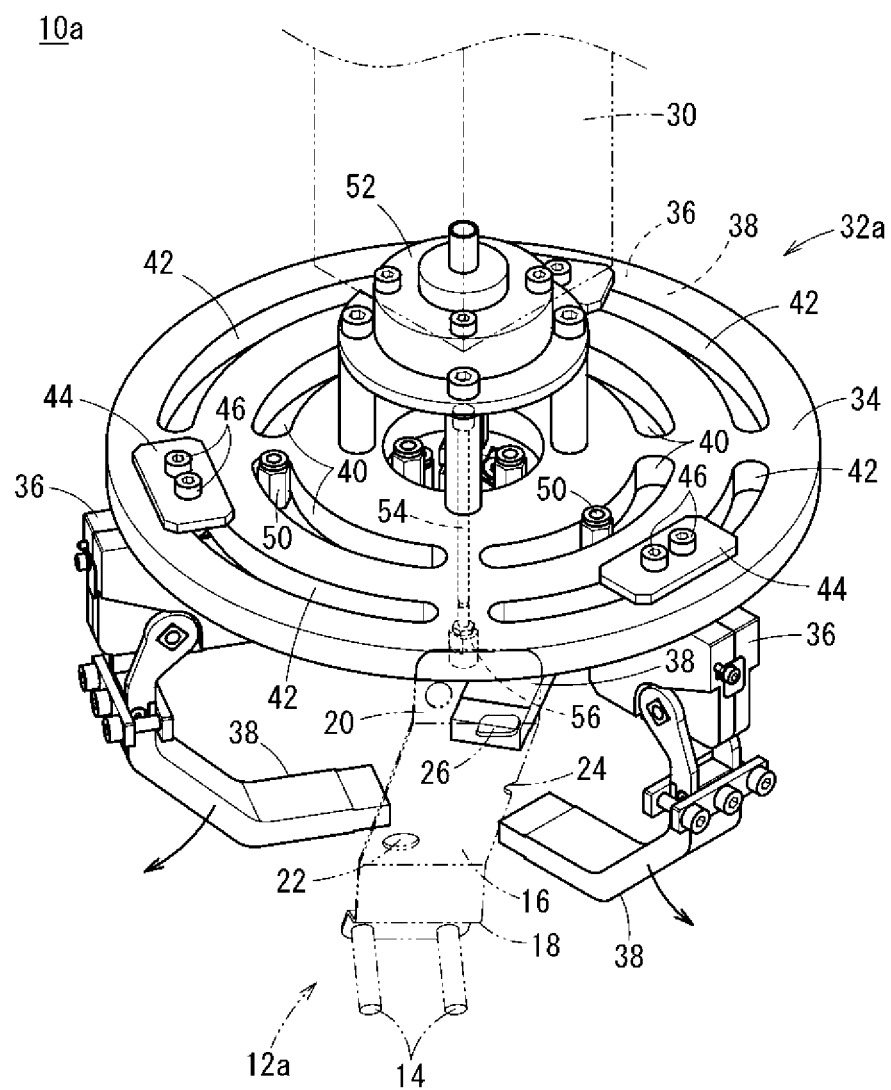
FIG. 2 is a perspective view schematically showing main components of the workpiece holding device shown in FIG. 1 in a state where a first workpiece is held by the workpiece holding device.

In this state, for example, the three holding cylinders 36 are actuated at the same time, and the tip ends of the three holding claws 38 are displaced closer to the first workpiece 12a. That is, the three holding claws 38 are closed. At this time, the two holding claws 38 contact one end surface of the flat part 16, and the remaining one holding claw 38 contacts the back surface of the flat part 16. As a result, as shown in FIG. 2, the holding claws 38 are placed in the clamped state, and the first workpiece 12a is gripped by the holding claws 38.

As necessary, the pushing cylinder 52 is actuated, and the rod 54 moves downward. Consequently, the pusher 56 pushes (contacts) the bent portion 20. As a result of this pushing, the first workpiece 12a is pressed from above, and sway of the first workpiece 12a is suppressed. That is, in the state where the first workpiece 12a is stabilized, the first workpiece 12a is gripped firmly.

Next, the robot moves the end arm 30 as necessary in a manner that the holding part 32a and the first workpiece 12a are displaced together. Thus, the first workpiece 12a is transported to a predetermined position together with the holding part 32a. Thereafter, the pushing cylinder 52 is operated to move the rod 54 upward. As a result, the pusher 56 is spaced from the first workpiece 12a. Further, the three holding cylinders 36 are operated at the same time. As a result, the three holding claws 38 are spaced from the first workpiece 12a at the same time. That is, the holding claws 38 are opened, and placed in the unclamped state. The first workpiece 12a is released from the holding claws 38.

Figure 3:
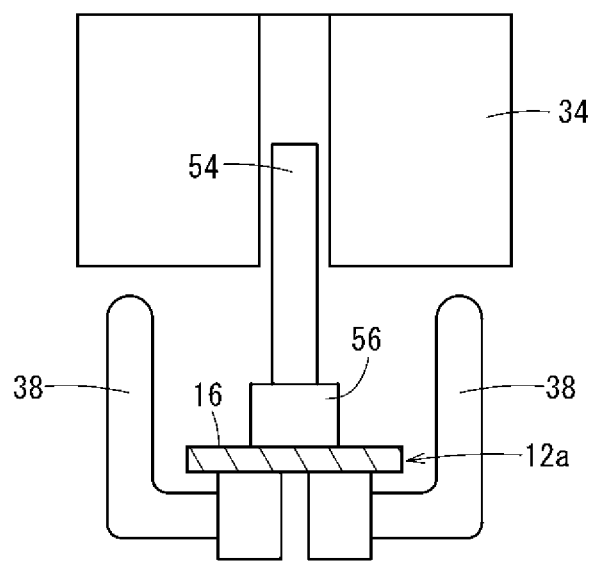
FIG. 3 is a view schematically showing main components of the workpiece holding device in a state where the first workpiece is held in another orientation.

In the case where the workpiece can be held firmly only by the holding claws 38, there is no special need for the pusher 56 to push the workpiece. Further, in the case where the longitudinal direction of the workpiece is oriented in a horizontal direction, as shown in FIG. 3 where only two holding claws 38 are illustrated and the two holding claws 38, the rod 54, and the pusher 56 are illustrated in a simplified form, the workpiece may be lifted by the closed holding claws 38, and the workpiece may be held using the pusher 56 to push the upper end surface of the workpiece.

Further, it is possible to change the positions of the holding claws 38 suitably depending on the shape of the workpiece. That is, after the bolts 46 are loosened to release the holding cylinders 36, the holding cylinders 36 are displaced along the circumference of the support disk 34. At this time, the fittings 50 are displaced along the inner circular arc slits 40 to guide the holding cylinders 36. As described above, by forming the inner circular arc slits 40 in the support disk 34 and inserting the fittings 50 into the inner circular arc slits 40 in a displaceable manner, it becomes possible to move the holding cylinders 36 to predetermined positions easily.

The holding claws 38 may be rotated (closed) individually depending on the shape or the orientation of the workpiece. This case will be described as a second embodiment where magnet grippers are provided for the holding claws 38. The constituent elements of the second embodiment that are identical to those of the first embodiment are labeled with the same reference numerals, and detailed description thereof is omitted.

Figure 4:
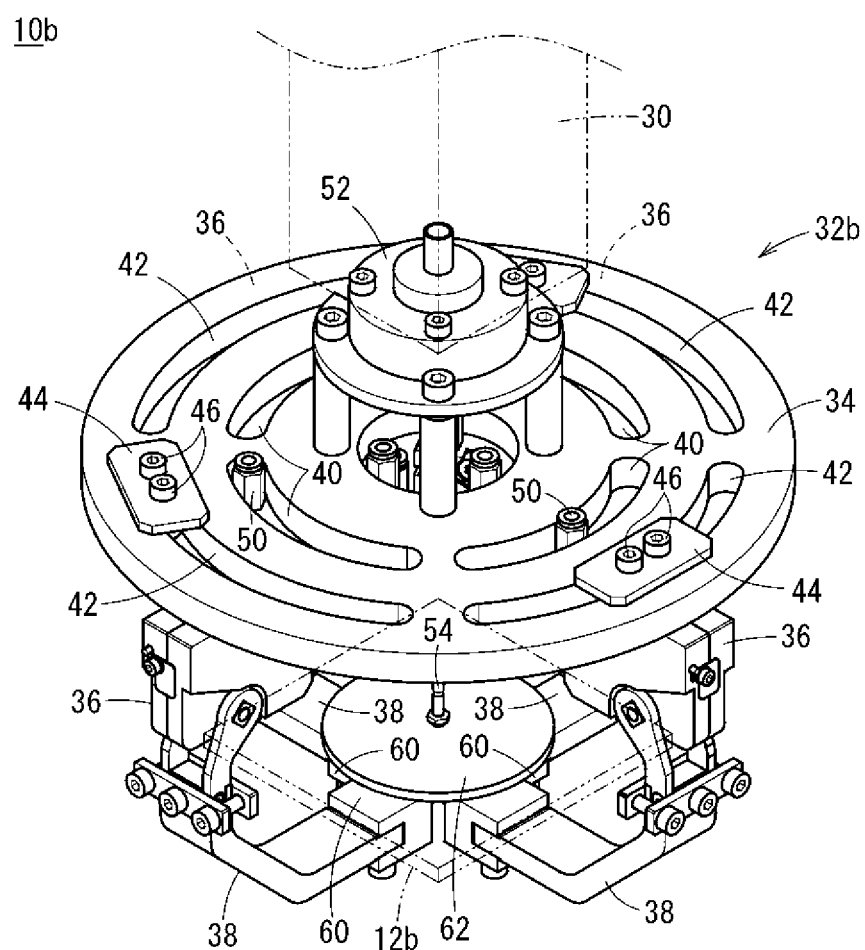
FIG. 4 is a perspective view schematically showing main components of a workpiece holding device according to a second embodiment of the present invention.

FIG. 4 is a perspective view schematically showing main components of a workpiece holding device 10b according to the second embodiment. The workpiece holding device 10b is configured to pick up one of a plurality of second workpieces 12b in the form of flat plates, and transport the picked-up second workpiece 12b to a predetermined position.

The workpiece holding device 10b includes a robot as a displacing member (transportation member), and a holding part 32b provided for the end arm 30 to hold the second workpiece 12b.

The holding part 32b includes a support disk 34, four holding cylinders 36, four holding claws 38, and a pushing cylinder 52. Four inner circular arc slits 40 and four outer circular arc slits 42 are formed in the support disk 34. The holding cylinders 36 are fixedly positioned to the support disk 34 through locking plates 44 and bolts 46.

A first magnet gripper 60 is provided at each of tip ends of the holding claws 38 that face one another. A supply/discharge tube (not shown) for supplying/discharging a compressed air is connected to the first magnet gripper 60. When the compressed air is supplied, the first magnet gripper 60 magnetically attracts the second workpiece 12b, and when the compressed air is discharged, the first magnet gripper 60 is detached from the second workpiece 12b.

Further, a second magnet gripper 62 in the form of a substantially circular disk is provided at a tip end of the rod 54 of the pushing cylinder 52. As with the first magnet gripper 60, when the compressed air is supplied through an unillustrated supply/discharge tube, the second magnet gripper 62 magnetically attracts the second workpiece 12b, and when the compressed air is discharged, the second magnet gripper 62 is detached from the second workpiece 12b. Since the above structure is known, the detailed description of the first magnet gripper 60 and the second magnet gripper 62 is omitted.

Next, operation and effects of the workpiece holding device 10b according to the second embodiment will be described.

The robot moves the end arm 30 as necessary for making positional alignment in a manner that the end arm 30 moves to a position adjacent to the stocker, and a predetermined one of the second workpieces 12b that are arranged in parallel is positioned at the center of the concentric circles formed by the inner circular arc slits 40 and the outer circular arc slits 42, i.e., substantially and immediately below the second magnet gripper 62. At this time, the holding claws 38 are in the unclamped state where the holding claws 38 are spaced from one another.

Figure 5:
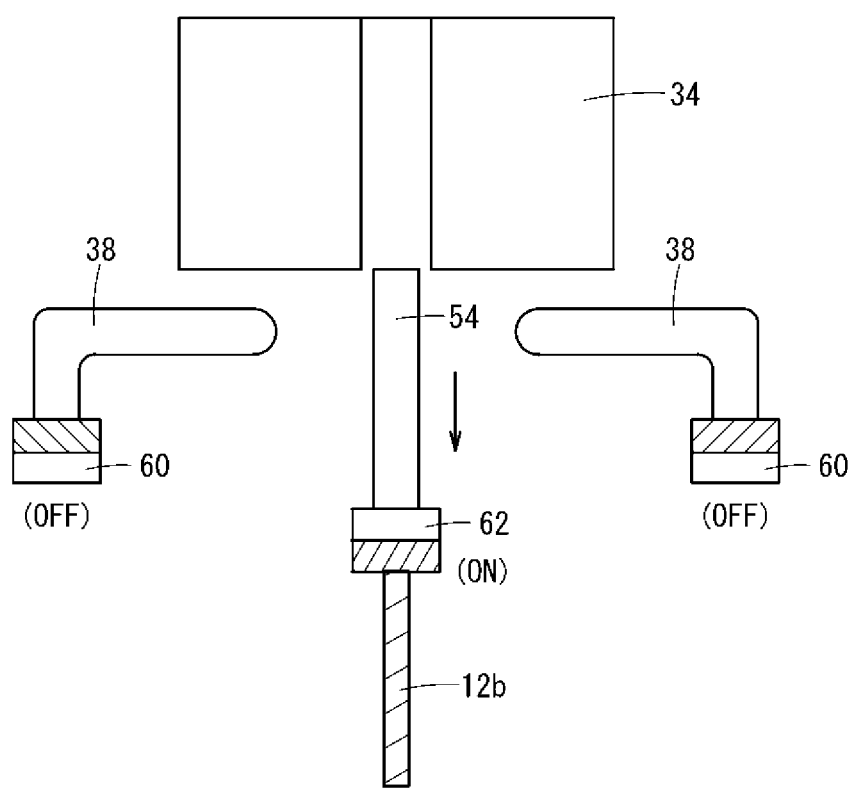
FIG. 5 is a view schematically showing main components of the workpiece holding device shown in FIG. 4 in a state where a second workpiece is magnetically attracted by a second magnet gripper of the workpiece holding device.

In this state, the pushing cylinder 52 is operated, and the rod 54 is lowered. As a result, as shown in FIG. 5, the second magnet gripper 62 contacts the upper surface of the second workpiece 12b. It should be noted that in FIG. 5, and likewise, in the subsequent drawings, only two holding claws 38 are illustrated, and the two holding claws 38, the rod 54, the first magnet grippers 60, and the second magnet gripper 62 are illustrated in the simplified form. Further, the first magnet grippers 60 and the second magnet gripper 62 are denoted by double frames. Hatching added in the frame adjacent to the second workpiece 12b indicates that the magnet gripper is in the ON state. Hatching added in the frame remote from the second workpiece 12b indicates that the magnet gripper is in the OFF state. That is, in the former case, the second workpiece 12b magnetically attracts the second magnet gripper 62, and in the latter case, the second workpiece 12b is released form the second magnet gripper 62.

In the state shown in FIG. 5, the second magnet gripper 62 is in the ON state. Therefore, the second workpiece 12b which contacts the second magnet gripper 62 is attracted magnetically, thus, the second workpiece 12b is held by the second magnet gripper 62.

Figure 6:
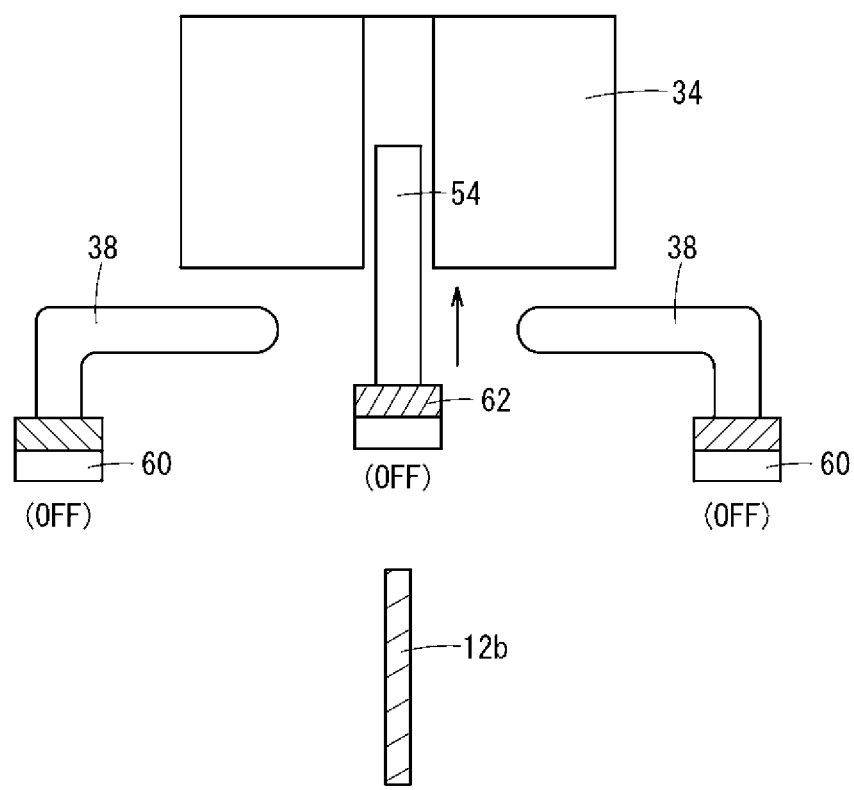
FIG. 6 is view schematically showing main components of the workpiece holding device in a state where the second workpiece is released after the state in FIG. 5.

In the case where the number of the magnetically attracted second workpieces 12b is one, transportation may be carried out in this state. That is, the robot moves the end arm 30 as necessary, and displaces the holding part 32b and the second workpiece 12b together. As a result, the second workpiece 12b is transported to a predetermined position together with the holding part 32b. Thereafter, as shown in FIG. 6, the second magnet gripper 62 is placed in the OFF state. The second magnet gripper 62 is spaced from the second workpiece 12b, and the pushing cylinder 52 is operated to move the rod 54 upward. In this manner, the second workpiece 12b is released from the second magnet gripper 62.

Figure 7:
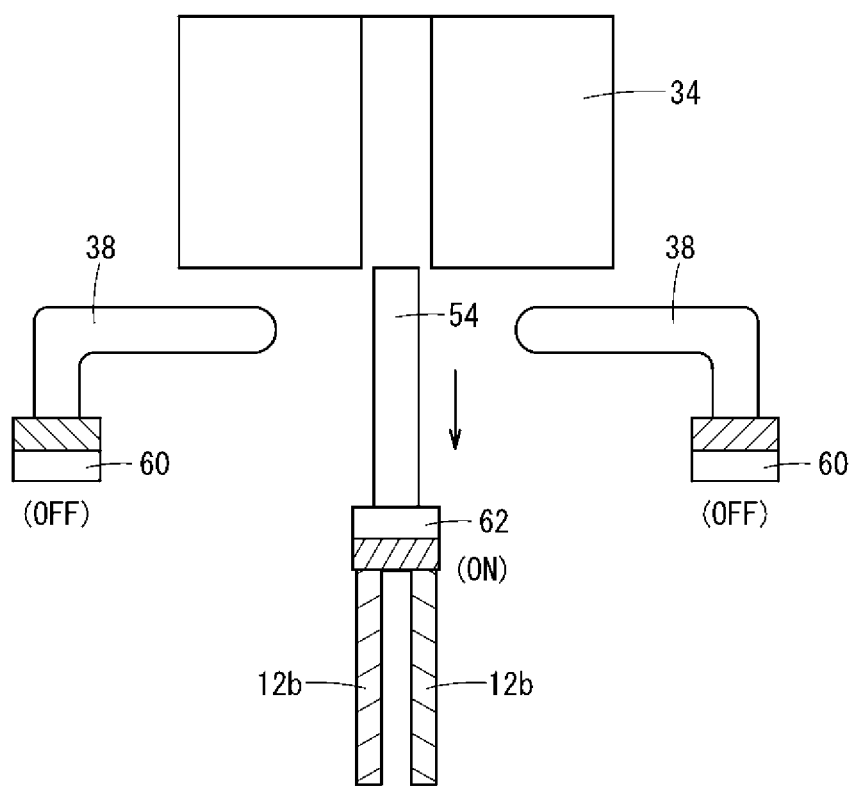
FIG. 7 is a view schematically showing main components of the workpiece holding device in a state where two second workpieces are magnetically attracted by the second magnet gripper.
Figure 8:
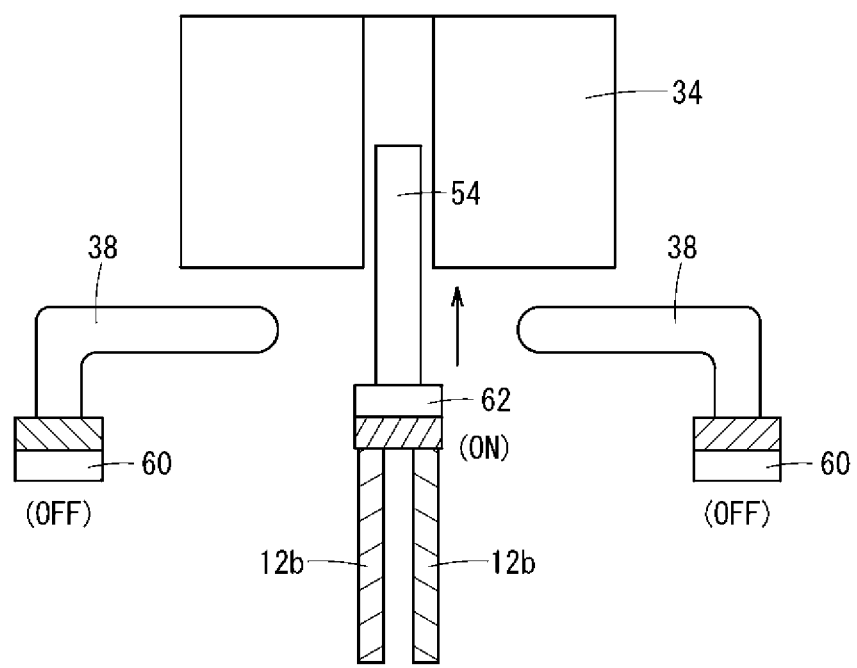
FIG. 8 is a view schematically showing main components of the workpiece holding device in a case where a rod is elevated after the state in FIG. 7.
Figure 9:
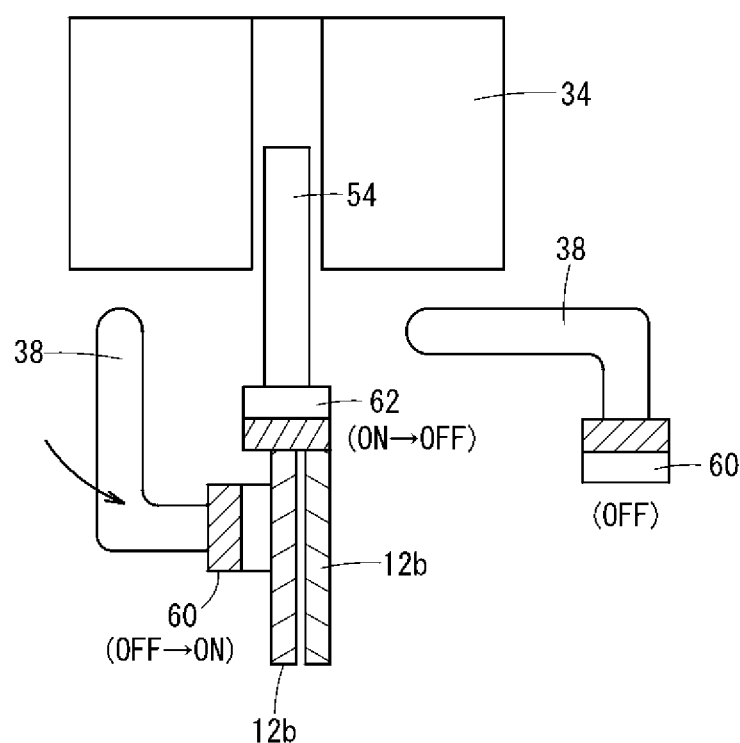
FIG. 9 is a schematically showing main components of the workpiece holding device in a state where a holding claws are rotated, and the holding claws contact the second workpiece after the state in FIG. 8.

It should be noted that, as shown in FIG. 7, the second magnet gripper 62 may magnetically attract a plurality of the second workpieces 12b. In this case, as shown in FIG. 8, after the rod 54 is elevated, for example, as shown in FIG. 9, only one holding cylinder 36 is operated, and the first magnet gripper 60 of the one holding claw 38 contacts one main surface of the second workpiece 12b which faces the first magnet gripper 60. At this time, the first magnet gripper 60 is placed in the ON state, and the second magnet gripper 62 is placed in the OFF state.

Figure 10:
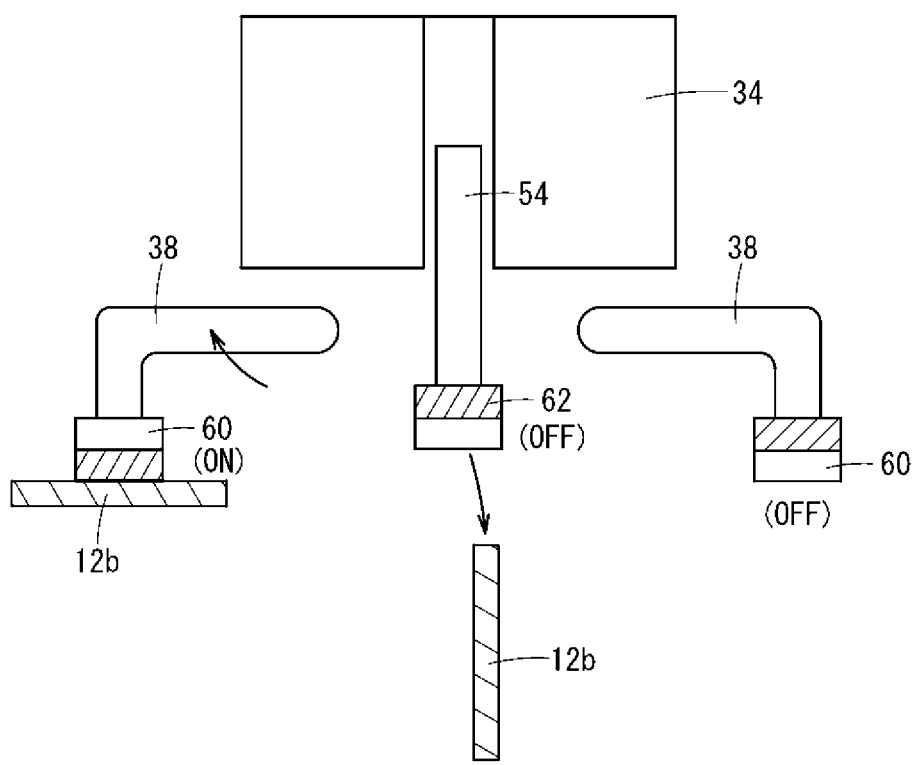
FIG. 10 is a view schematically showing main components of the workpiece holding device in a case where the second magnet gripper is placed in the OFF state, and the first magnet gripper is placed in the ON state and the holding claws have been returned to their original positions, after the state in FIG. 9.

As a result, as shown in FIG. 10, the second workpiece 12b which is in contact with the first magnet gripper 60 is released from binding by the magnetic force of the second magnet gripper 62, and is magnetically attracted by the first magnet gripper 60. At the same time, the second workpiece 12b which is not in contact with the first magnet gripper 60 is released from binding by the magnetic force of the second magnet gripper 62, and detached from the holding part 32b. Thereafter, the holding cylinder 36 is operated, and the closed holding claws 38 are opened to return to their original positions. That is, the second workpiece 12b is held by the first magnet gripper 60 such that the longitudinal direction of the second workpiece 12b is oriented in a horizontal direction.

Figure 11:
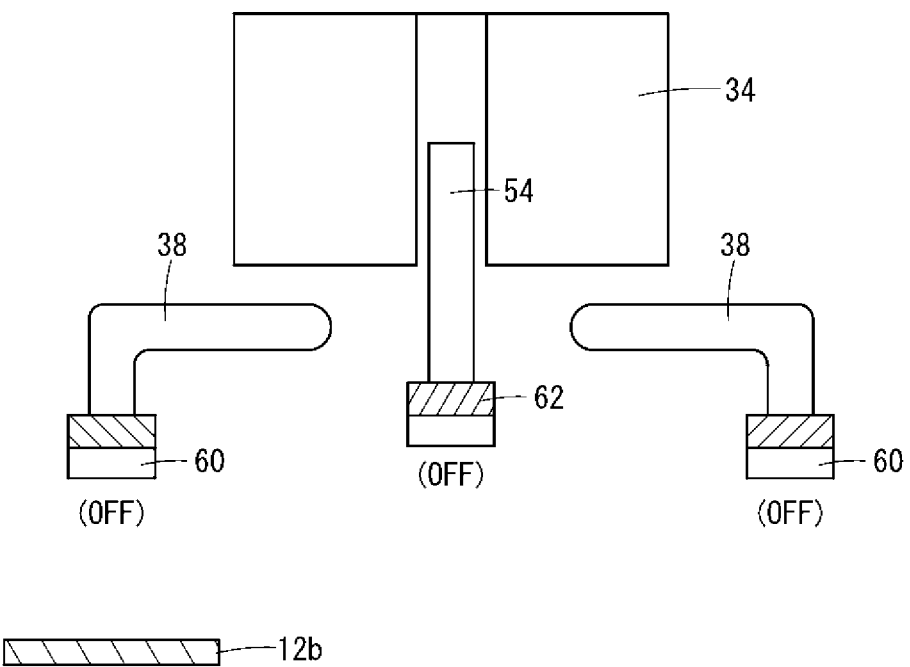
FIG. 11 is a view schematically showing main components of the workpiece holding device in a case where the first magnet gripper is placed in the OFF state, and the second workpiece is released, after the state in FIG. 10.

Next, the robot operates the end arm 30 as necessary, and displaces the holding part 32b and the second workpiece 12b held by the first magnet gripper 60. Thus, the second workpiece 12b and the holding part 32b are transported together to a predetermined position. Thereafter, as shown in FIG. 11, the first magnet gripper 60 is placed in the OFF state. As a result, the second workpiece 12b is released from the first magnet gripper 60.

As described above, the holding cylinder 36 is provided for each of the holding claws 38. By allowing the holding claws 38 to be opened/closed (or to rotate) individually, it becomes possible to sort, and hold only one of the plurality of second workpieces 12b that are provided in parallel. That is, it is possible to only transport the required number of second workpieces 12b.

Further, as can be seen from FIGS. 5 and 10, it is possible to transport the second workpiece 12b in different orientations. For this reason, it can be understood that, in the case where the workpieces have different shapes, by suitably setting the orientations, the respective workpieces can be transported suitably. As necessary, the positions of the holding claws 38 may be changed to suitable positions, in the same manner as in the case of the first embodiment. In this manner, also in the workpiece holding device 10b according to the second embodiment, it is possible to hold workpieces in various shapes.

The present invention is not limited specially to the first embodiment and the second embodiment. Various modifications can be made without deviating from the gist of the present invention.

For example, the number of the holding claws 38 is not limited to three or four. The number of the holding claws 38 may be two, or four or more.

Further, it is not essential to provide the first magnet gripper 60, the second magnet gripper 62, the pushing cylinder 52, and the pusher 56. The workpiece holding device may have structure where these component parts are omitted.

The invention claimed is:

1. A workpiece holding device including a plurality of holding claws configured to hold a workpiece, the workpiece holding device comprising:
    a plurality of claw opening/closing members provided for the holding claws, respectively, such that the holding claws are displaceable in a direction closer to or away from the workpiece;
    a holding member configured to hold each of the claw opening/closing members in an individually movable manner;
    a displacing member configured to displace the holding member together with the holding claws;
    a guide member configured to guide the claw opening/closing members when any of the respective claw opening/closing member is moved relative to the holding member; and
    inner and outer arc slits concentrically provided in the holding member, wherein:
    each of the claw opening/closing members is provided to be movable, along with a respective one of the holding claws, along one of the inner and outer arc slits,
    each of the claw opening/closing members is provided to be fixedly positioned at a respective inner and outer arc slit, and
    the guide member is guided to be displaced along the other of the inner and outer arc slits when the respective claw opening/closing member is moved along one of the inner and outer arc slits.

2. The workpiece holding device according to claim 1, further comprising a magnet gripper provided for the holding claw, the magnet gripper being configured to magnetically attract the workpiece.

3. The workpiece holding device according to claim 1, further comprising a contact part configured to be displaced in a direction closer to or away from the workpiece, and configured to contact the workpiece when the contact part is displaced to a position close to the workpiece.

4. The workpiece holding device according to claim 3, further comprising a magnet gripper provided for the contact part, the magnet gripper being configured to magnetically attract the workpiece.

5. The workpiece holding device according to claim 1, wherein number of holding claws is three or four.

* * * * *